(12) United States Patent
Ouellet

(10) Patent No.: US 8,333,266 B2
(45) Date of Patent: Dec. 18, 2012

(54) BRAKE SYSTEM AND METHOD AND TWO-WHEELED VEHICLE USING THE SAME

(75) Inventor: Andrew Ouellet, Alameda, CA (US)

(73) Assignee: Conceptualized Engineering, Ltd., San Luis Obispo, CA (US)

( * ) Notice: Subject to any disclaimer, the term of this patent is extended or adjusted under 35 U.S.C. 154(b) by 286 days.

(21) Appl. No.: 12/638,944

(22) Filed: Dec. 15, 2009

(65) Prior Publication Data

US 2010/0090434 A1  Apr. 15, 2010

Related U.S. Application Data

(63) Continuation-in-part of application No. 12/564,890, filed on Sep. 22, 2009, now abandoned, which is a continuation-in-part of application No. 12/477,888, filed on Jun. 3, 2009, now abandoned.

(60) Provisional application No. 61/059,096, filed on Jun. 5, 2008.

(51) Int. Cl.
*B62L 1/02* (2006.01)

(52) U.S. Cl. ............... 188/24.12; 188/24.13; 188/24.16; 188/2 D; 74/500.5; 74/502

(58) Field of Classification Search ............... 188/24.11, 188/24.12, 24.13, 24.16, 24.19, 2 D; 74/500.5, 74/502
See application file for complete search history.

(56) References Cited

U.S. PATENT DOCUMENTS

| 662,602 | A | | 11/1900 | Schmidt et al. | |
|---|---|---|---|---|---|
| 3,842,946 | A | * | 10/1974 | Blevens | 188/24.16 |
| 3,882,971 | A | | 5/1975 | Peckham, Jr. | 188/24 |
| 3,989,124 | A | * | 11/1976 | Fujii | 188/26 |
| 4,061,206 | A | * | 12/1977 | Wood | 188/26 |
| 4,102,439 | A | | 7/1978 | Calderazzo | 188/24 |
| 5,431,257 | A | * | 7/1995 | Rocca et al. | 188/24.21 |
| 5,501,301 | A | * | 3/1996 | Nishimura | 188/24.19 |
| 5,564,531 | A | | 10/1996 | Lumpkin | 188/24.19 |
| 5,775,466 | A | * | 7/1998 | Banyas et al. | 188/24.22 |
| 5,927,442 | A | * | 7/1999 | Liao | 188/24.16 |
| 6,098,486 | A | * | 8/2000 | Liao | 74/500.5 |
| 6,164,153 | A | * | 12/2000 | Scura | 74/502.4 |
| 6,386,328 | B1 | * | 5/2002 | Chen | 188/24.11 |
| 6,615,955 | B2 | * | 9/2003 | Jakovljevic | 188/24.14 |
| 6,899,202 | B1 | * | 5/2005 | McIntyre | 188/24.22 |
| 2009/0302565 | A1 | * | 12/2009 | Ouellet | 280/63 |
| 2010/0007112 | A1 | * | 1/2010 | Ouellet | 280/231 |

FOREIGN PATENT DOCUMENTS

DE  4122491 A1  7/1993

OTHER PUBLICATIONS

"International Search Report", mailed Sep. 16, 2010, PCT/US2010/041442.

* cited by examiner

*Primary Examiner* — Robert A Siconolfi
*Assistant Examiner* — Mariano Sy
(74) *Attorney, Agent, or Firm* — Dergosits & Noah LLP

(57) ABSTRACT

In the specification and drawing a new brake system and a two-wheeled vehicle using the same are described. The new brake system includes a first brake to apply a first brake force on a first wheel of a vehicle and transfers the first brake force to physically actuate a second brake to brake a second wheel of the vehicle. A new-designed cantilever brake is disclosed to transfer the first brake force to actuate the second brake.

20 Claims, 18 Drawing Sheets

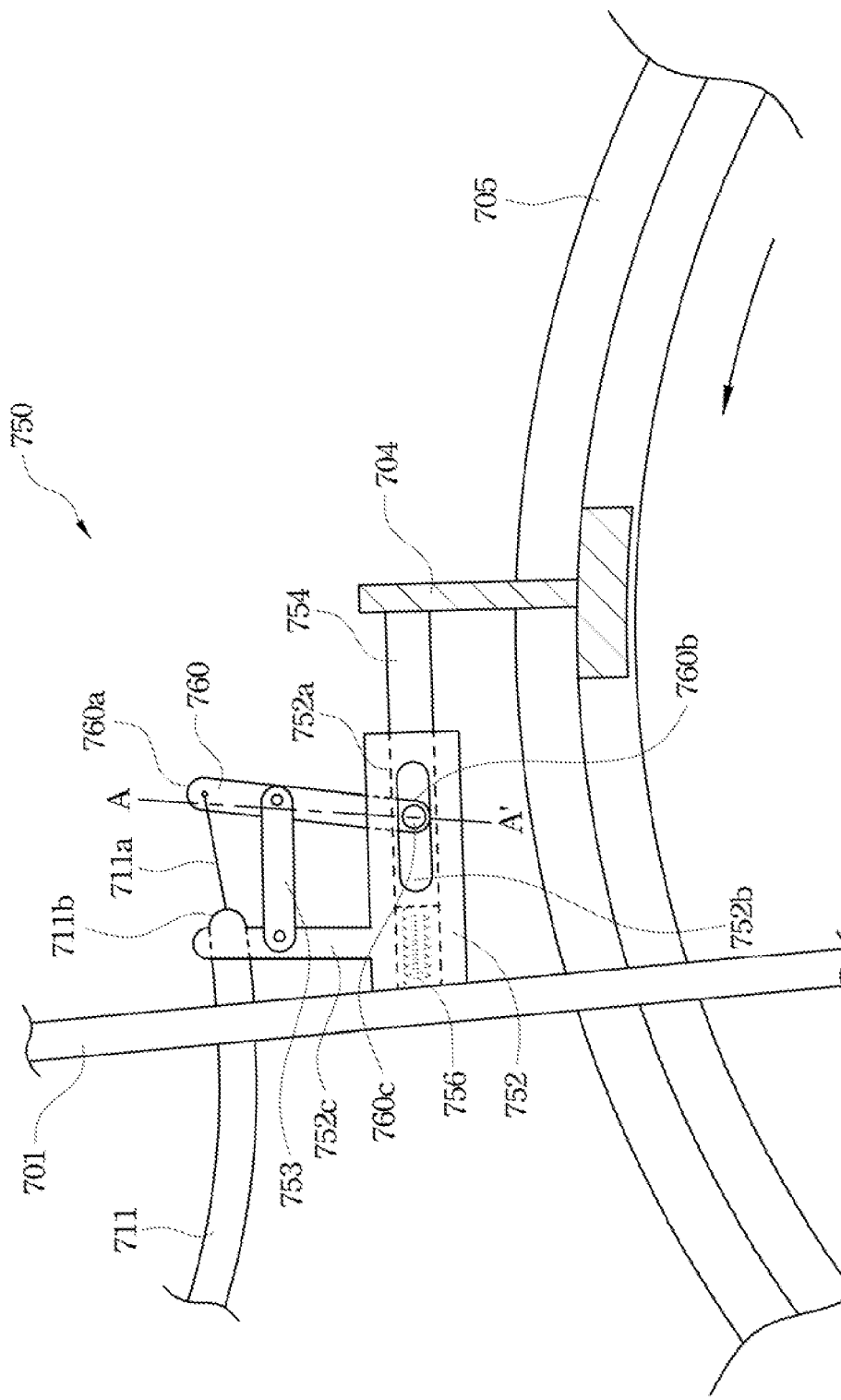

BRAKE SYSTEM AND METHOD AND TWO-WHEELED VEHICLE USING THE SAME

RELATED APPLICATIONS

This application is a continuation-in-part application of a Nonprovisional application Ser. No. 12/564,890, filed Sep. 22, 2009, which is a continuation-in-part application of a Nonprovisional application Ser. No. 12/477,888, filed Jun. 3, 2009, which claims priority to a Provisional Application Ser. No. 6,105,9096, filed Jun. 5, 2008, all of which are herein incorporated by reference.

BACKGROUND

1. Field of Invention

The present invention relates a brake system and method. More particularly, the present invention relates to a brake system and method for a two-wheeled vehicle.

2. Description of Related Art

A two-wheeled vehicle is equipped with a brake system to slow or stop its moving by applying friction upon its wheels. A rider uses both hands to press two brake levers, fixed on the handlebar, to control a front and rear brake of the two-wheeled vehicle. However, it would be dangerous if the rider presses either one of the brake levers too hard to make the vehicle's wheel to be locked by the front or rear brake. It is uncontrollable and dangerous for a moving two-wheeled vehicle with one of its wheels being locked, e.g. the vehicle may skid on the ground. In the instance of a two-wheeled vehicle's tip over, the two-wheeled vehicle still moves with its front wheel being locked such that the rider may fall over beyond a handlebar of the two-wheeled vehicle when a rear wheel comes off the ground by a sufficient height. For the forgoing reasons, there is a need for preventing a moving two-wheeled vehicle from a tip-over or a wheel being locked.

SUMMARY

In one aspect of the present invention, a cantilever brake includes two brake arms and a brake pad. The two brake arms are adapted to be respectively pivotally connected with two seat stays of a bicycle frame such that each brake arm is swiveled about a pivot axis. The brake pad is slidably connected with at least one of the two brake arms for applying a brake force on a first wheel and actuating a first brake cable of a second wheel's brake when the brake pad is in contact with the first wheel.

In another aspect of the present invention, a brake system includes a front brake and a rear cantilever brake. The front brake is to brake a front wheel and comprising a first brake cable. Two brake arms are adapted to be respectively pivotally connected with two seat stays of a bicycle frame such that each brake arm is swiveled about a pivot axis. The brake pad is slidably connected with at least one of the two brake arms and to actuate the first brake cable of the front brake when the brake pad is in contact with a rear wheel.

In still another aspect of the present invention, a two-wheeled vehicle includes a frame having a handlebar and two seat stays. The front wheel and a rear wheel are rotatably mounted on the frame. A front brake is to brake the front wheel and includes a first brake cable. A rear brake includes two brake arms and a brake pad. The two brake arms are adapted to be respectively pivotally connected with two seat stays of a bicycle frame such that each brake arm is swiveled about a pivot axis. The brake pad is slidably connected with at least one of the two brake arms for applying a brake force on a first wheel and actuating a first brake cable of a second wheel's brake when the brake pad is in contact with the first wheel.

According to an embodiment of the present invention, the brake pad is slidably connected with at least one of the two brake arms along a direction generally in parallel with the pivot axis.

According to another embodiment of the present invention, the rear (cantilever) brake further includes a slider slidably connected with a slider guide, the brake pad is secured to the slider and the slider guide is secured to the at least one of the two brake arms.

According to another embodiment of the present invention, the slider comprises brass and the slider guide comprises bronze.

According to another embodiment of the present invention, the two brake arms comprise aluminum, titanium or magnesium.

According to another embodiment of the present invention, the rear (cantilever) brake further includes an L-shaped bracket having an end secured to the at least one of the two brake arms and an opposite end to hold the first brake cable.

According to another embodiment of the present invention, the rear (cantilever) brake further includes a second brake cable associated with respective upper ends of the two brake arms to actuate the rear cantilever brake.

According to another embodiment of the present invention, the two brake arms comprise respective lower ends to be pivotally connected with two seat stays of the bicycle frame.

Thus, the new brake system provides a new braking way-using a first brake force of a first brake to physically actuate a second brake to brake a second wheel. This new braking way is able to solve a two-wheeled vehicle's tip-over, that is, to prevent a front brake from being locked. Moreover, the new braking way permits the rider to use either one hand to press single brake lever so as to actuate two brakes upon front and rear wheels.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of to the invention, and are incorporated in and constitute a part of this specification. The drawings illustrate embodiments of the invention and, together with the description, serve to explain the principles of the invention. In the drawings.

FIG. 7 illustrates a rear brake and a transmission device according to still another embodiment of this invention;

DESCRIPTION OF THE EMBODIMENTS

Figure 1:
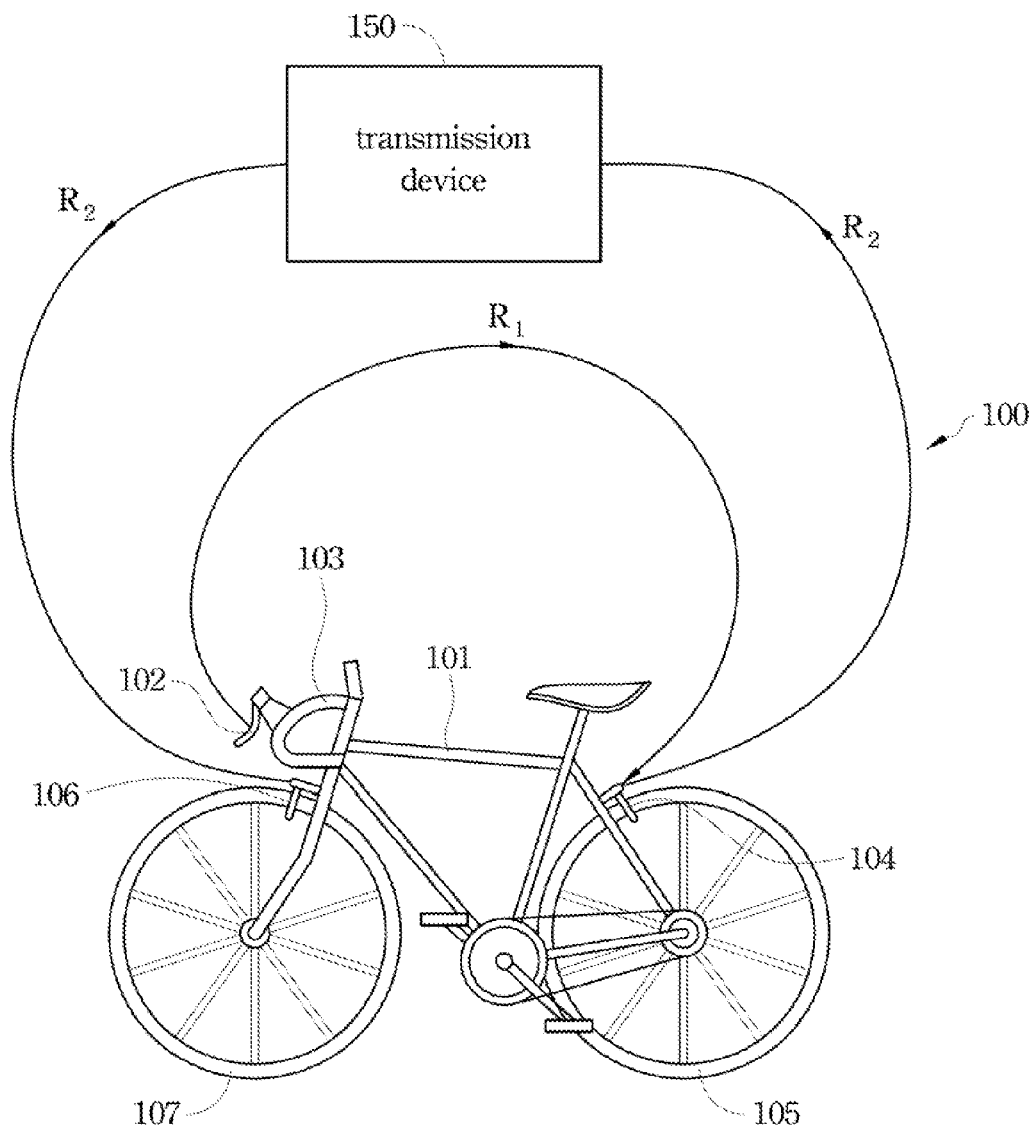
FIG. 1 illustrates a bicycle according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a bicycle according to one embodiment of this invention. A new brake system is implemented on the bicycle 100 to prevent a tip-over instance in which a front wheel is locked, i.e. cannot rotate or hardly rotate relative to a front brake, when the bicycle still moves. The bicycle 100 has a frame 101 on which a front wheel 107 and a rear wheel 105 are rotatably mounted. In a first braking route $R_1$ of this embodiment, a rear brake 104 is actuated by a brake lever 102 fastened on a handlebar 103 of a bicycle frame so as to apply a brake force on a rear wheel 105, i.e. by squeezing the rear brake 104 upon a rim of the rear wheel 105. In a second braking route $R_2$ of this embodiment, the brake force (friction between the rear brake 104 and the rear wheel 105) is transferred by a transmission device 150 to physically actuate the front brake 106 so as to brake a front wheel 107, i.e. by squeezing the front brake 106 upon a rim of the front wheel 107. By "physically", it means, "to actuate the brake in a way able to be touched and seen, rather than something unable to be touched and seen, e.g. an electrical signal". That is, the transmission device 150 utilizes a pure physical way to transfer a brake force of a brake to actuate another brake. Since the front brake 106 is actuated by the rear brake force, the front brake 106 would not be locked when no rear brake force occurs. In the instance of a bicycle's tip-over being liable to happen, the rear wheel coming off the ground would result in almost no rear brake force, thereby releasing the front brake 106. Therefore, the rear wheel is allowed to stay on the ground again and a bicycle's tip-over is prevented.

Figure 2:
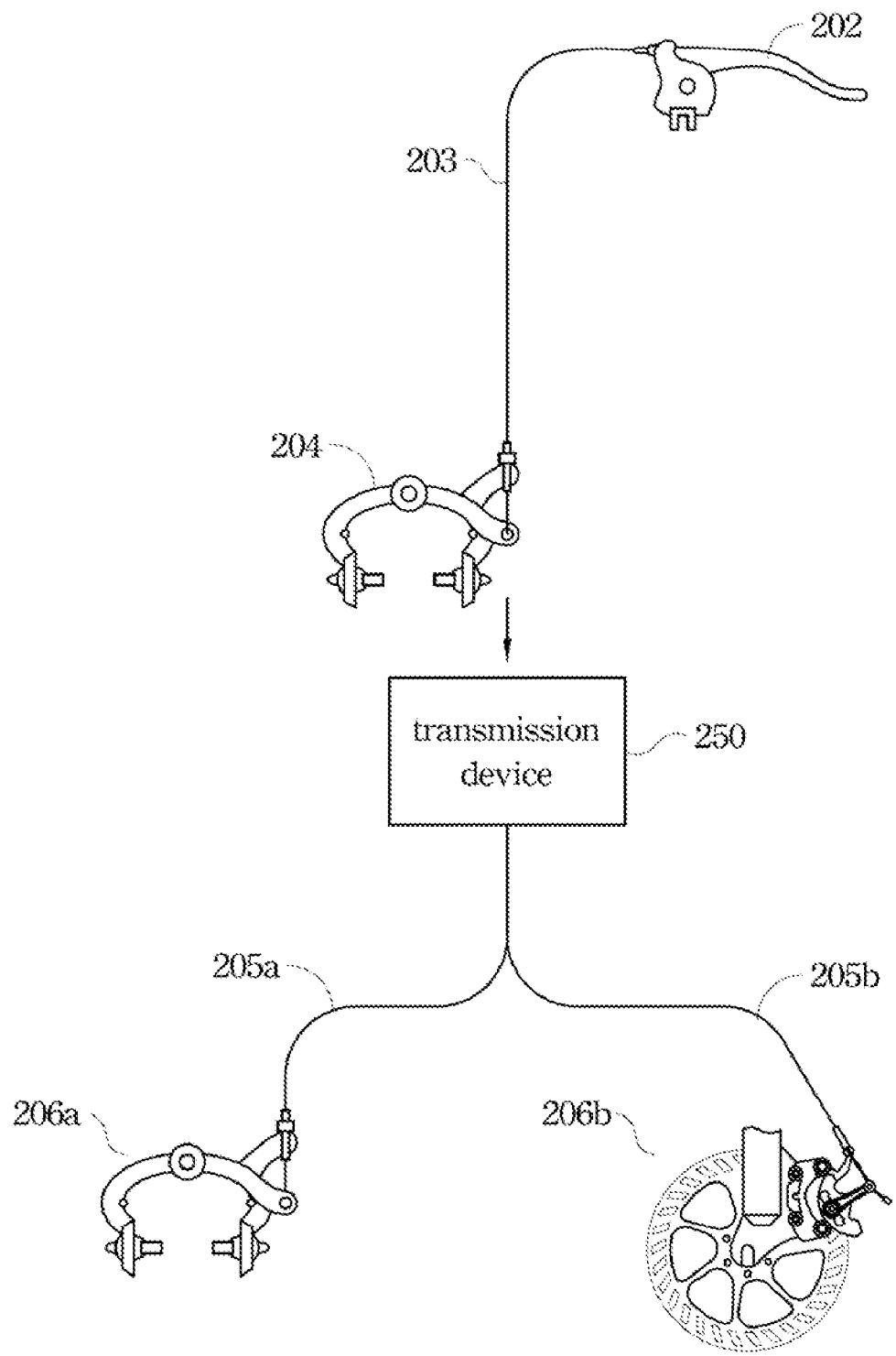
FIG. 2 illustrates a brake system according to one embodiment of this invention.

FIG. 2 illustrates a brake system according to one embodiment of this invention. The new brake system includes a brake lever 202, a first brake 204 (a rim brake), a transmission device 250 and a second brake 206a (a rim brake) or 206b (a disc brake). The brake lever 202 is controlled by a rider to actuate the first brake 204 through a brake cable 203. The transmission device 250 is to proportionally transfer a brake force of the first brake 204 to actuate the second brake 206a or 206b through respective brake cables 205a or 205b. In the embodiment of FIG. 1, the first brake 204 is a rear brake and the second brake 206a or 206b is a front brake. In an alternate embodiment, the first brake 204 may be a front brake and the second brake 206a or 206h may be a rear brake. In such case, the transmission device 250 may be used to proportionally transfer the first brake 204 (a front brake) to actuate the second brake 206a or 206b (a rear brake) such that the front brake has a larger brake force than the rear brake does. In such case where a proper front/back brake ratio is applied upon front, rear wheels, a bicycle's tip-over can be prevented in a different way.

Figure 3:
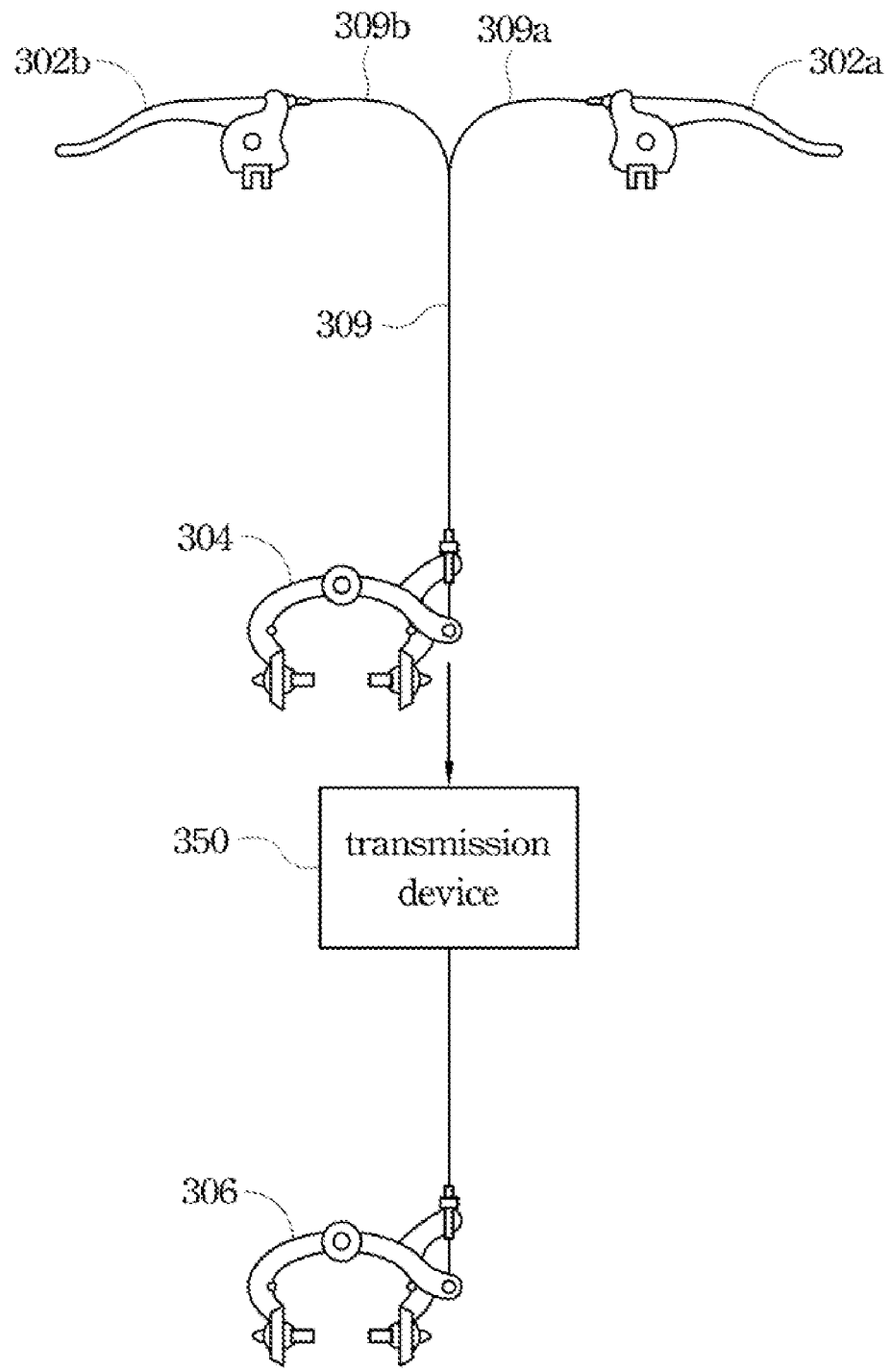
FIG. 3 illustrates a brake system according to another embodiment of this invention.

FIG. 3 illustrates a brake system according to another embodiment of this invention. The new brake system may include two brake levers (302a, 302b), a first brake 304, a transmission device 350 and a second brake 306. In this embodiment, two brake levers (302a, 302b) are used to actuate the first brake 304 where a wire core 309a and a wire core 309b are bonded to commonly pull a wire core 309. This design shares a pull force of the wire core 309b with two wire cores (309a, 309b), which are respectively pulled by two brake levers (302a, 302b). Thus, a rider may use both hands to apply less force on two brake levers (302a, 302b) to actuate the first brake 304. However, it is still proper to use either one of two brake levers (302a, 302b) to actuate the first brake 304. The transmission device 350 is to proportionally transfer a brake force of the first brake 304 to actuate the second brake 306.

Figure 4:
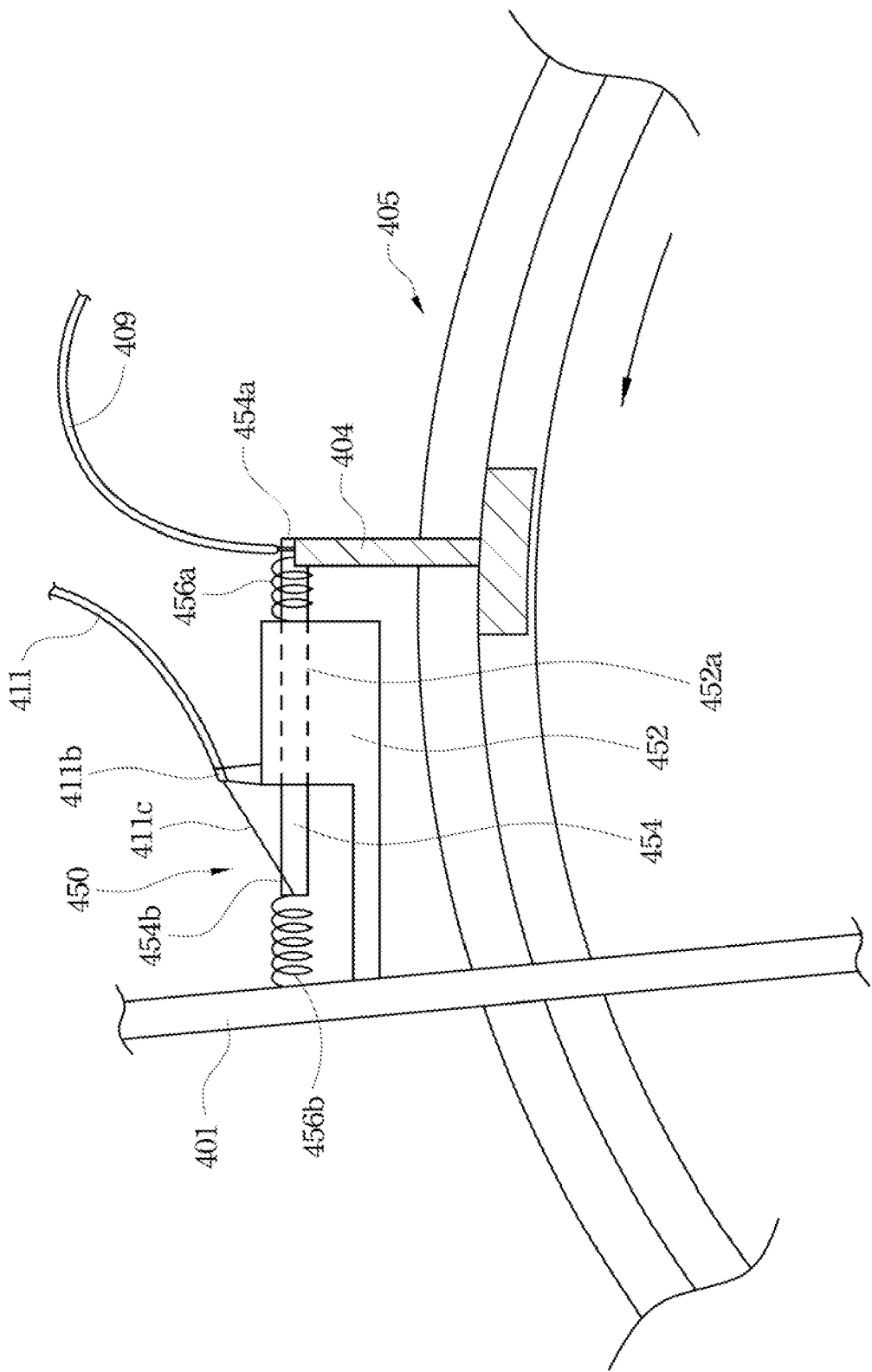
FIG. 4 illustrates a rear brake and a transmission device according to one embodiment of this invention.

FIG. 4 illustrates a rear brake and a transmission device according to one embodiment of this invention. This Figure embodies the first brake (104, 204, 304) as a rear rim brake 404, which is actuated through a brake cable 409. In this embodiment, the transmission device 450 transfers a brake force of the rear brake 404 to pull a wire core 411c of the brake cable 411. The transmission device 450 includes a support bracket 452, an actuating member 454 and a resilient member (456a or 456b). The support bracket 452 is secured to a frame 401 of a two-wheeled vehicle, i.e. a bicycle or motorcycle. The actuating member 454 is movably, e.g. slidably, connected within a through hole 452a of the support bracket 452. The actuating member 454 has an end 454a fixed to the rear brake 404 and an opposite end 454b connected with the wire core 411c. A bearing may be installed within the through hole 452a (not illustrated in the drawings) to permit the actuating member 454 to be smoothly slid relative to the support bracket 452. The resilient member 456a has an end secured to an end 454a of the actuating member 454 and an opposite end secured to the support bracket 452. The resilient member 456b has an end secured to an end 454b of the actuating member 454 and an opposite end secured to the frame 401. Both resilient members (456a, 456b) or either one of them can be used to press the actuating member 454 against a brake force of the rear brake 404. When the rear brake 404 is actuated to brake the rear wheel 405, the brake force of the rear brake 404 drives the actuating member 454 against the resilient member (456a, 456b) to pull the wire core 411c of the brake cable 411. Therefore, a front brake can be actuated by the pulled wire core 411c. When the rear brake 404 is not actuated, i.e. no contact between the rear brake 404 and the rear wheel 405, the resilient member returns the actuating member 454 to an original position. In the instance of the rear wheel 405 corning off the ground, the rear brake 404 is actuated to brake the rear wheel 405, but the resilient member still returns the actuating member 454 to an original position, thereby releasing the wire core 41c of the brake cable 411 and the front brake. The brake cable 411 has an end 411b secured to the support bracket 452 and an opposite end (not illustrated in this figure) secured to a front brake, e.g. reference numeral 106 in FIG. 1.

In an alternate embodiment, the resilient members (456a, 456b) may be removed. The front brake has resilient members (such as spring) in itself that keep tension in the wire core 411c. The resilient members also lift the brake pads off the rims. That force puts tension in the wire core 411c and is usually enough to return the actuating member 454 to its original position. If the resilient members in the front brake are not strong enough, then one can be added to the transmission device 450.

Figure 5:
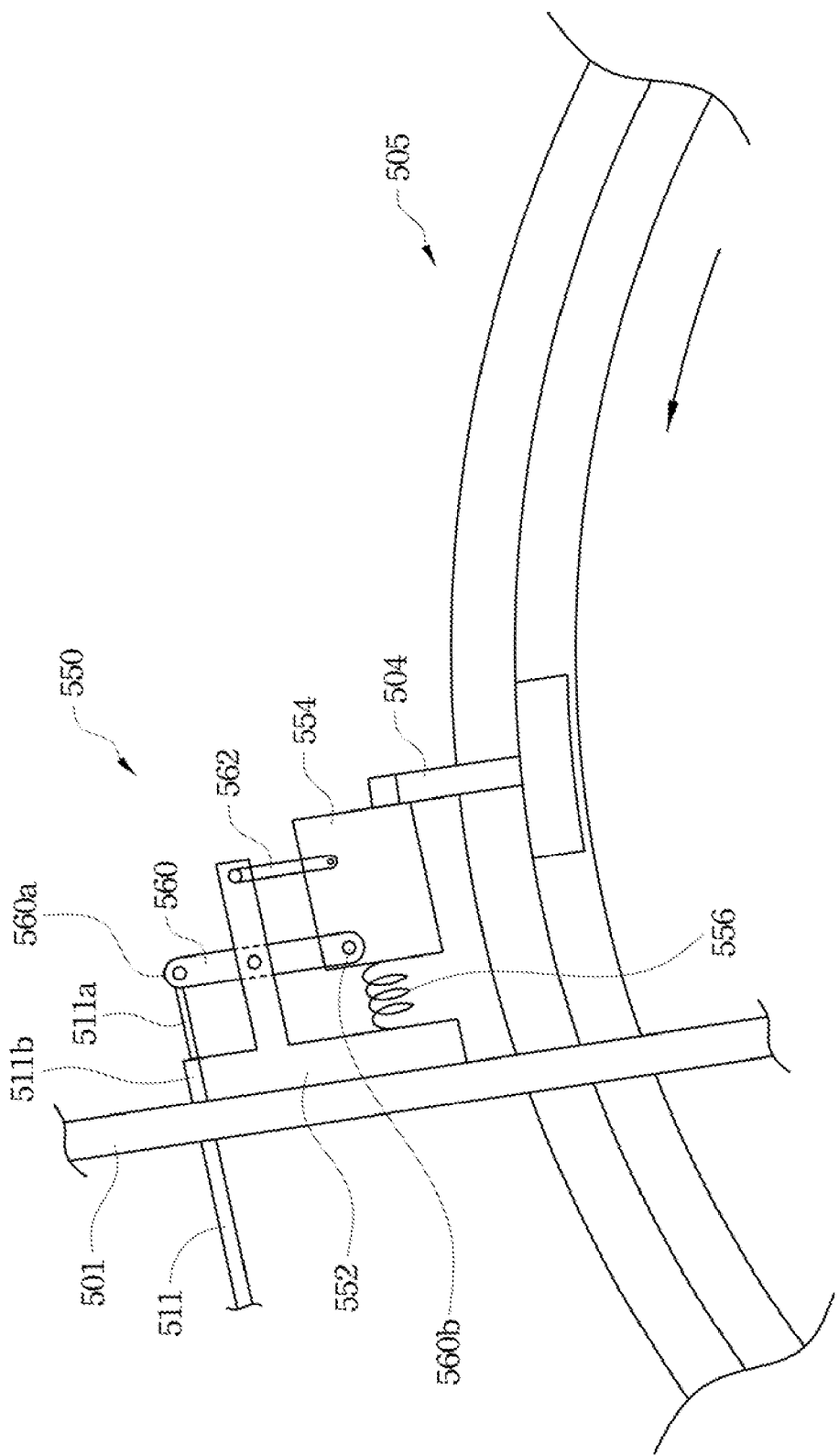
FIG. 5 illustrates a rear brake and a transmission device according to another embodiment of this invention.

FIG. 5 illustrates a rear brake and a transmission device according to another embodiment of this invention. This Figure embodies the first brake (104, 204, 304) as a rear rim brake 504 (a brake cable of the rear rim brake 504 is omitted). In this embodiment, the transmission device 550 transfers a brake force of the rear brake 504 to pull a wire core 511a of the brake cable 511. The transmission device 550 includes a support bracket 552, an actuating member 554, a lever 560 and a resilient member 556. The support bracket 552 is secured to a frame 501 of a two-wheeled vehicle, i.e. a bicycle or motorcycle. The actuating member 554 is movably connected with the support bracket 552 by the lever 560 and a connection bar 562. The lever 560 has a middle section (a section excluding two ends of the lever 560), which is pivotally connected with the support bracket 552. In addition, the lever 560 has an end 560a connected with the wire core 511a of the brake cable 511 and an opposite end 560b pivotally connected with the actuating member 554. The rear brake 504 is fixed to the actuating member 554. The resilient member 556 has an end secured to the actuating member 554 and an opposite end secured to the support bracket 552. When the rear brake 504 is actuated to brake the rear wheel 505, the brake force of the rear brake 504, i.e. friction between the rear wheel 505 and the rear brake 504, moves the rear brake 504 itself and drives the actuating member 554 against the resilient member 556 to push the end 560b of the lever 560 and the opposite end 560a of the lever 560 then pulls the wire core 511a of the brake cable 511. The lever 560 herein is to proportionally transfer the brake force of the rear brake 504 to pull the brake cable 511 by an action of levering. Therefore, a front brake can be actuated by the pulled wire core 511a. When the rear brake 504 is not actuated, i.e. no contact between the rear brake 504 and the wheel 505, the resilient member 556 returns the actuating member 554 to an original position. In the instance of the rear wheel 505 coming off the ground, the rear brake 504 is actuated to brake the rear wheel 505, but the resilient member 556 still returns the actuating member 554 to an original position, thereby releasing the wire core 511a of the brake cable 511. The brake cable 511 has an end 511b secured to the support bracket 552 and an opposite end (not illustrated in this figure) secured to a front brake, e.g. reference numeral 106 in FIG. 1.

In an alternate embodiment, the resilient member 556 may be removed. The front brake has resilient members (such as spring) in itself that keep tension in the wire core 511c. The resilient members also lift the brake pads off the rims. That force puts tension in the wire core 511c and is usually enough to return the actuating member 554 to its original position. If the resilient members in the front brake are not strong enough, then one can be added to the transmission device 550.

Figure 6:
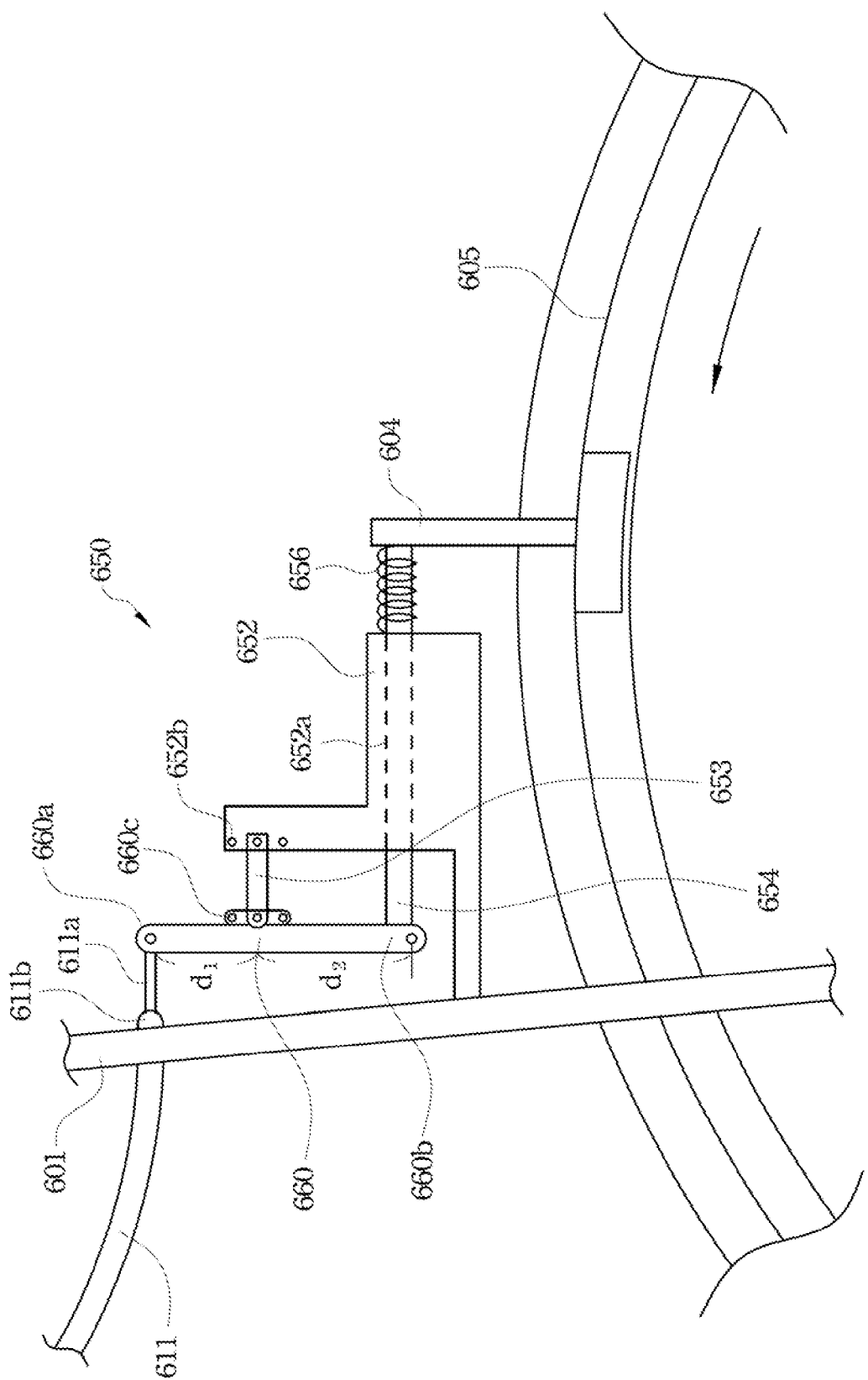
FIG. 6 illustrates a rear brake and a transmission device according to still another embodiment of this invention.

FIG. 6 illustrates a rear brake and a transmission device according to still another embodiment of this invention. This Figure embodies the first brake (104, 204, 304) as a rear rim brake 604 (a brake cable of the rear rim brake 604 is omitted). In this embodiment, the transmission device 650 transfers a brake force of the rear brake 604 to pull a wire core 611a of the brake cable 611. The transmission device 650 includes a support bracket 652, an actuating member 654, a lever 660 and a resilient member 656. The support bracket 652 is secured to a frame 601 of a two-wheeled vehicle, i.e. a bicycle or motorcycle. The actuating member 654 is movably, e.g. slidably, connected within a through hole 652a of the support bracket 652. A bearing may be installed within the through hole 652a (not illustrated in the drawings) to permit the actuating member 654 to be smoothly slid relative to the support bracket 652. The lever 660 has a middle section, i.e. a section excluding two ends of the lever 660, pivotally connected with a connection bar 653, which is further pivotally connected with the support bracket 652. When the lever 660 swings to and fro, the connection bar 653 would slightly tilt up and down. In addition, the lever 660 has an end 660a connected with the wire core 611a of the brake cable 611 and an opposite end 660b pivotally connected with the actuating member 654. The lever 660 herein is to proportionally transfer the brake force of the rear brake 604 to pull the brake cable 611 by an action of levering. The rear brake 604 is fixed to the actuating member 654. The resilient member 656 has an end secured to the actuating member 654 and an opposite end secured to the support bracket 652. When the rear brake 604 is actuated to brake the rear wheel 605, the brake force of the rear brake 604, i.e. friction between the rear wheel 605 and the rear brake 604, drives the actuating member 654 against the resilient member 656 to push the end 660b of the lever 660 and the opposite end 660a of the lever 660 then pulls the wire core 611a of the brake cable 611. Therefore, a front brake can be actuated by the pulled wire core 611a. When the rear brake 604 is not actuated, i.e. no contact between the rear brake 604 and the wheel 605, the resilient member 656 returns the actuating member 654 to an original position. In the instance of the rear wheel 605 coming off the ground, the rear brake 604 is actuated to brake the rear wheel 605, but the resilient member 656 still returns the actuating member 654 to an original position, thereby releasing the wire core 611a of the brake cable 611. The brake cable 611 has an end 611b secured to the frame 601 and an opposite end (not illustrated in this figure) secured to a front brake, e.g. reference numeral 106 in FIG. 1.

In an alternate embodiment, the resilient member 656 may be removed. The front brake has resilient members (such as spring) in itself that keep tension in the wire core 611a. The resilient members also, lift the brake pads off the rims. That force puts tension in the wire core 611a and is usually enough to return the actuating member 654 to its original position. If the resilient members in the front brake are not strong enough, then one can be added to the transmission device 650.

In the embodiment of FIG. 6, a leverage ratio adjusting mechanism is used to adjust a leverage ratio of the lever 660. In particular, the lever 660 has three pivot holes 660a while the support bracket 652 has three fastening holes 652b. The connection bar 653 can be selected to interconnect (the upper pivot hole 660a and the upper fastening hole 652b), or (the intermediate pivot hole 660a and the intermediate fastening hole 652b), or (the lower pivot hole 660a and the lower fastening hole 652b) such that the lever 660 can have three different leverage ratios. Moreover, the connection bar 653 can be made longer or shorter, as well as changing the length, e.g. $d_1$ or $d_2$, of the lever 660 to achieve a desired leverage ratio. In an alternate embodiment, the leverage ratio adjusting mechanism may have two, four or more sets of pivot holes and fastening holes to permit the connection bar 653 to be interconnected with.

In order for any vehicle to achieve the minimum possible stopping distance, (neglecting skidding of the front tire(s)), 100% of the braking force should be applied to the front brake, and the rear wheel should be kept just barely off the ground. This however, is not practical or safe. No vehicles use only front brakes because it is dangerous and causes excessive wear. The brake system disclosed herein attempts to mimic a safe and efficient front/back brake ratio of approximately 75/25. This has been found to be most preferred by test riders, allowing the rider to stop quickly and effortlessly, yet not making the brakes overly touchy.

The front/rear brake ratio can be tuned by the above-mentioned leverage ratio adjusting mechanism. The optimum ratio best suited for most riders has been a 70/30 front/back brake ratio in the beginning of the lever stroke, and ending with an 80/20 front/back brake ratio towards the end of the lever stroke. At this 80/20 leverage ratio, the rider must only supply 20% of the braking force needed to the rear tire. The system then magnifies that force 4 times and directs it to the front brake. Because a rider only must supply 20% of the braking force, the strength required for a rider to stop quickly in minimal distance is greatly decreased, allowing inexperienced and weaker riders to stop quickly and safely.

Figure 7A:
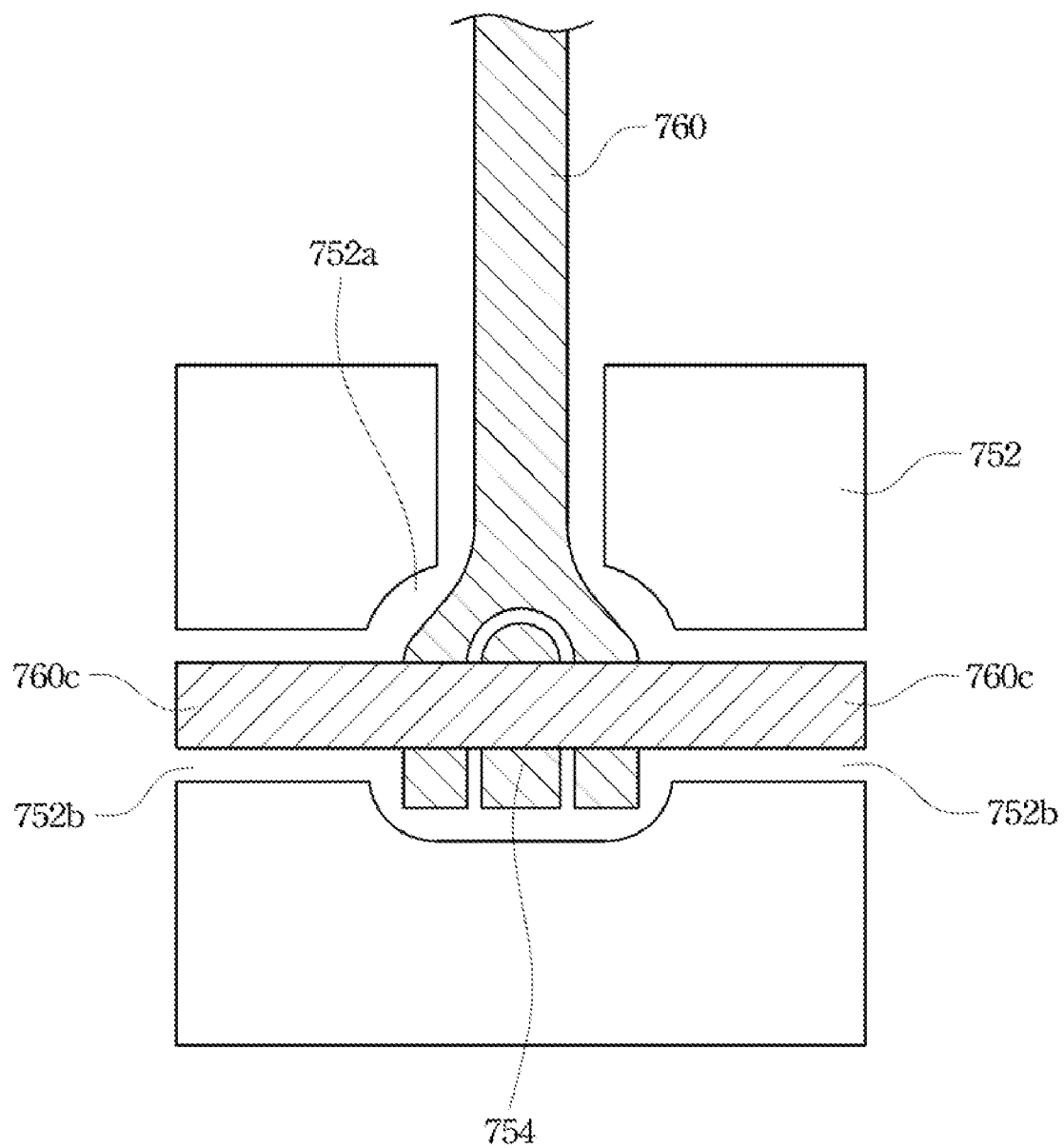
FIG. 7A illustrates a cross-sectional view taken along A-A' in FIG. 7.

FIG. 7 illustrates a rear brake and a transmission device according to still another embodiment of this invention. FIG. 7A illustrates a cross-sectional view taken along A-A' in FIG. 7. These two Figures embody the first brake (104, 204, 304) as a rear rim brake 704 (a brake cable of the rear rim brake 704 is omitted). In this embodiment, the transmission device 750 transfers a brake force of the rear brake 704 to pull a wire core 711a of the brake cable 711. The transmission device 750 includes a support bracket 752, an actuating member 754, a lever 760 and a resilient member 756. The support bracket 752 is secured to a frame 701 of a two-wheeled vehicle, i.e. a bicycle or motorcycle. The actuating member 754 is movably, e.g. slidably, connected within a through hole 752a of the support bracket 752. The support bracket 752 further includes a hollow slot 752b to permit a pivot pin 760c to be slid within, thereby restricting the lever 760 and the actuating member 754 to be moved within a predetermined distance. The pivot pin 760c is to pivotally interconnect the actuating member 754 and the lever 760, i.e. the pivot pin 760c penetrates through the actuating member 754 and the lever 760. Two fasteners (not illustrated in the drawings) may be attached on two ends of the pivot pin 760c to prevent it from slipping off from the actuating member 754 and the lever 760. The lever 760 has a middle section, i.e. a section excluding two opposite ends of the lever 760, pivotally connected with a connection bar 753. The connection bar 753 is further pivotally connected with an upper arm 752c of the support bracket 752. The connection bar 753 can be made longer or shorter, as well as changing the length of the lever 760 to achieve a desired leverage ratio. When the lever 760 swings to and fro, the connection bar 753 would slightly tilt up and down. In addition, the lever 760 has an end 760a connected with the wire core 711a of the brake cable 711 and an opposite end 760b pivotally connected with the actuating member 754. The lever 760 herein is to proportionally transfer the brake force of the rear brake 704 to pull the brake cable 711 by an action of levering. The rear brake 704 is fixed to the actuating member 754. The resilient member 756, which is located within the through hole 752a, has an end secured to the actuating member 754 and an opposite end secured to the support bracket 752. When the rear brake 704 is actuated to brake the rear wheel 705, the brake force of the rear brake 704, i.e. friction between the rear wheel 705 and the rear brake 704, drives the actuating member 754 against the resilient member 756 to push the end 760b of the lever 760 and the opposite end 760a of the lever 760 then pulls the wire core 711a of the brake cable 711. Therefore, a front brake can be actuated by the pulled wire core 711a. When the rear brake 704 is not actuated, i.e. no contact between the rear brake 704 and the wheel 705, the resilient member 756 returns the actuating member 754 to an original position. In the instance of the rear wheel 705 coming off the ground, the rear brake 704 is actuated to brake the rear wheel 705, but the resilient member 756 still returns the actuating member 754 to the original position, thereby releasing the wire core 711a of the brake cable 711. The brake cable 711 has an end 711b fastened to a top end of the upper arm 752c and an opposite end (not illustrated in this figure) secured to a front brake, e.g. reference numeral 106 in FIG. 1.

In an alternate embodiment, the resilient member 756 may be removed. The front brake has resilient members (such as spring) in itself that keep tension in the wire core 711a. The resilient members also lift the brake pads off the rims. That force puts tension in the wire core 711a and is usually enough to return the actuating member 754 to its original position. If the resilient members in the front brake are not strong enough, then one can be added to the transmission device 750.

Although the embodiments in FIG. 4, FIG. 5, FIG. 6 and FIG. 7 are implemented as a rear rim brake, the same designs or structures can also be implemented on a disk brake or on a front brake. For example, if the transmission devices 450, 550, 650 and 750 are implemented on a front brake, the support brackets 450, 550, 650 and 750 can be secured to a front fork of a two-wheeled vehicle. If the transmission devices 450, 550, 650 and 750 are implemented on a disk brake, the support brackets 450, 550, 650 and 750 can be secured to a frame and close to a hub of a front wheel or a rear wheel such that the brake can be used to squeeze the brake disk of the front or rear wheel, instead of a rim of the front or rear wheel.

Figure 8:
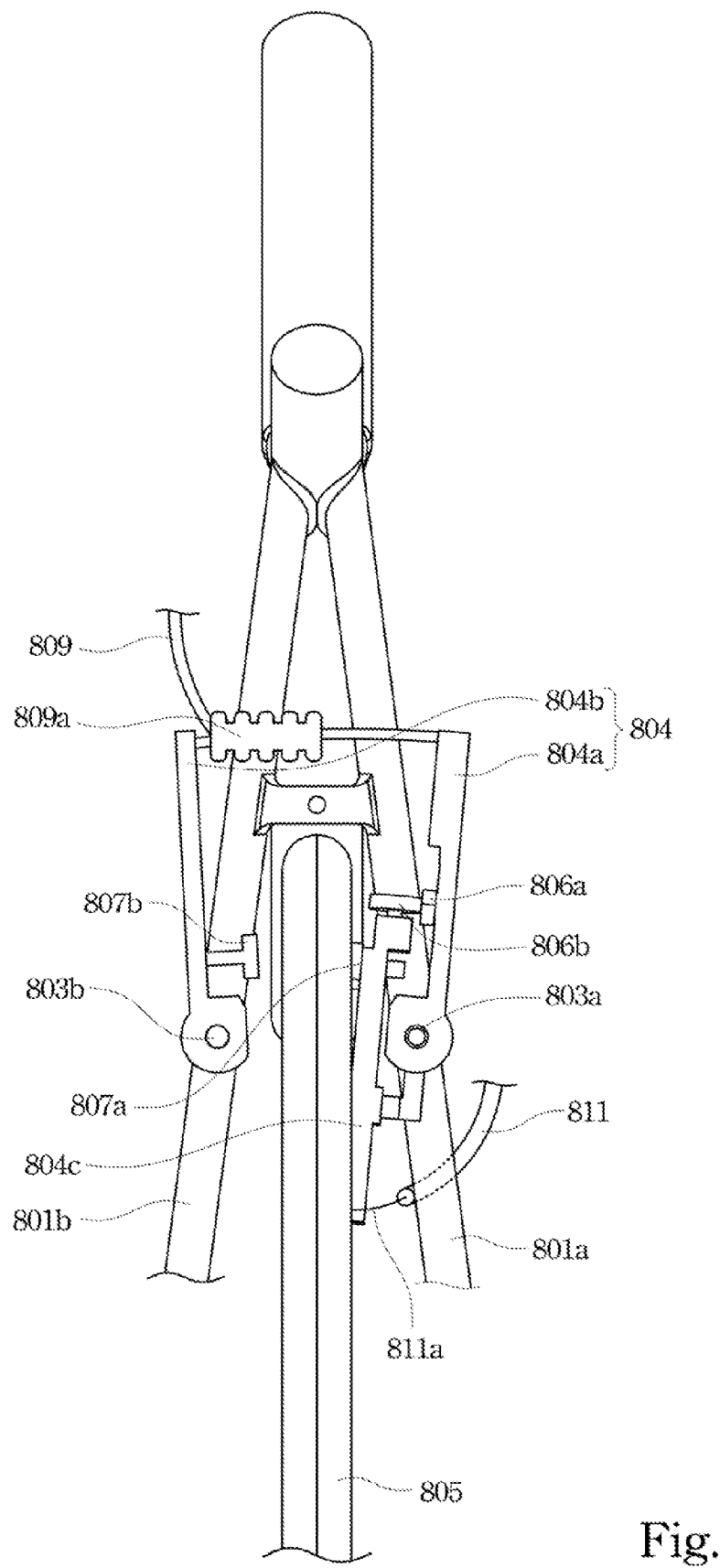
FIG. 8 illustrates a rear cantilever brake and a transmission device according to one embodiment of this invention.
Figure 8A:
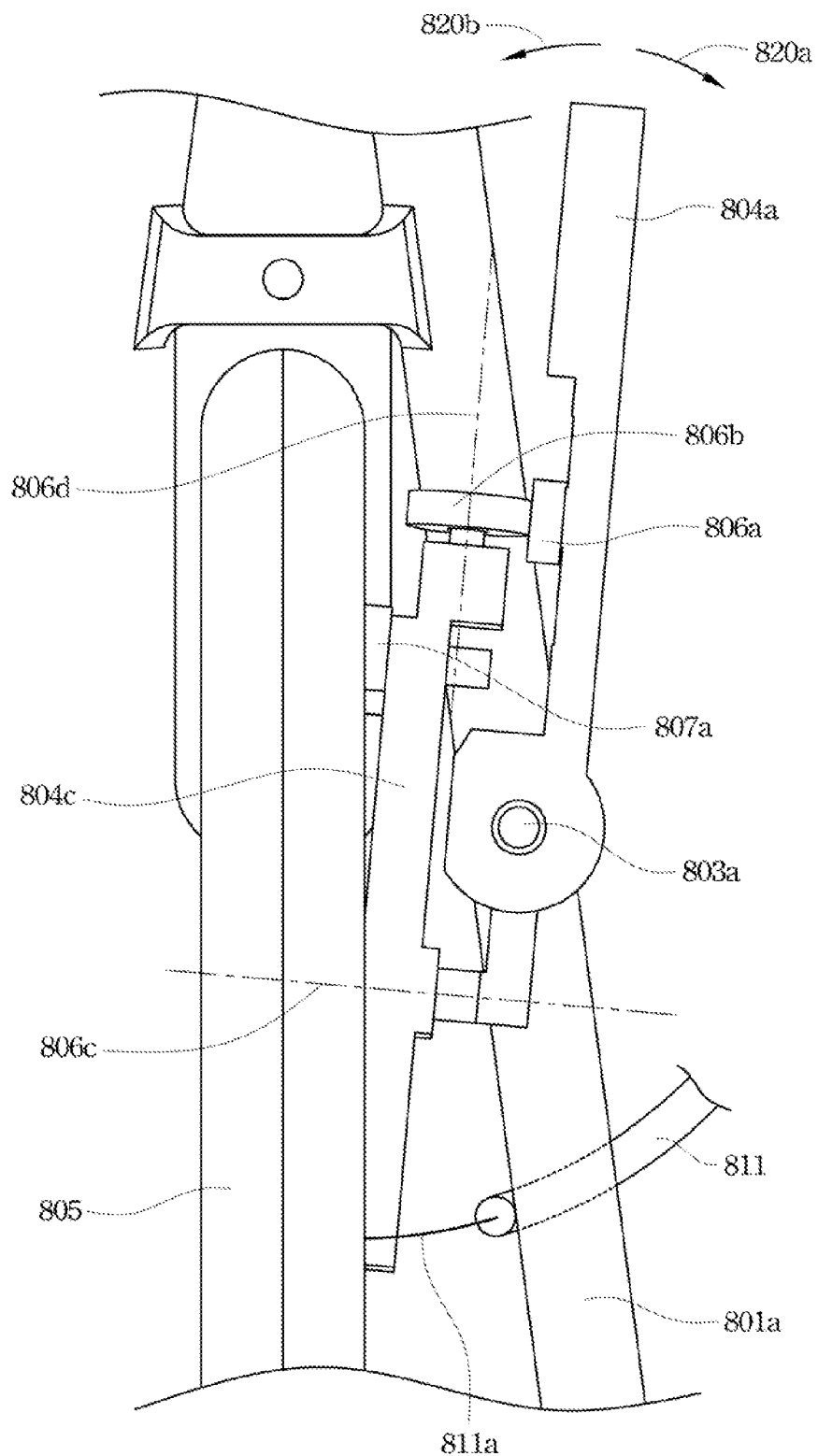
FIG. 8A illustrates an enlarged view of a right half of the rear cantilever brake and the transmission device as illustrated in FIG. 8.

FIG. 8 illustrates a rear cantilever brake and a transmission device according to one embodiment of this invention. FIG. 8A illustrates an enlarged view of a right half of the rear cantilever brake and the transmission device as illustrated in FIG. 8. In this embodiment, a transmission device is integrated into another type of rim brake "cantilever brake". A rear cantilever brake 804 basically includes two brake arms (804a, 804b). The transmission device, i.e. an auxiliary arm 804c, may be integrated into either one or both of the two brake arms (804a, 804b). The brake arm 804a is pivotally connected with a seat stay 801a (part of a bicycle frame) with its mid section so as to be swiveled about a pivot axis 803a. The brake arm 804b is pivotally connected with a seat stay 801b (part of a bicycle frame) so as to be swiveled about a pivot axis 803b. A brake cable 809 (e.g. a Bowden cable) is associated with both two upper ends of the two brake arms (804a, 804b) to actuate their respective brake pads (807a, 807b) to brake a rear wheel 805. A resilient member 809a, e.g. containing a compression spring inside, is to return two upper ends of the two brake arms (804a, 804b) to an original position where the brake cable 809 is not actuated by a brake lever, e.g. the brake lever 202 as illustrated in FIG. 2.

Although the cantilever brake illustrated in FIG. 8 embodies a side-pull cantilever brake (also referred as a V-brake), the transmission device is also integrated into other types of cantilever brakes, e.g. a centre-pull cantilever brake.

Referring again to FIG. 8A, an operation mechanism of the rear cantilever brake's right half is further described below. The auxiliary arm 804c is pivotally connected with a lower end of the brake arm 804a with its mid section so as to be swiveled about a pivot axis 806c. The pivot axis 806c is substantially perpendicular to the pivot axis 803a. A lower end of the auxiliary arm 804c is used to actuate a wire core 811a of a brake cable 811 (e.g. a Bowden cable), which is secured to the seat stay 801a. An upper end of the auxiliary arm 804c is equipped with the brake pad 807a and a roller 806a, e.g. a rolling-element bearing. The roller 806a rolls against a substantially flat surface of a support member 806a such that the upper end of the auxiliary arm 804c is slidably connected with the brake arm 804a. By "substantially flat" herein, it means the surface is flat enough to permit the roller 806a to be smoothly rolled thereon. The roller 806a rotates about a pivot axis 806d, which is substantially perpendicular to the pivot axis 806c. The brake arm 804a can be swiveled along a direction 820b to move the auxiliary arm 804c along such that the brake pad 807a can brake the rear wheel 805. The support member 806a of the brake arm 804a is to press the roller 806b such that the brake pad 807a is capable of stably braking the rear wheel 805. When the rear cantilever brake is not actuated, the brake arm 804a can be swiveled back to an original position along a direction 820a.

It should be noted that the support member 806a and the roller 806a are herein to provide a relative motion and support between the upper end of the auxiliary arm 804c and brake arm 804a. This mechanism, i.e. the support member and the roller, may be replaced by other mechanism, which could provide a low-friction and slidable connection between the upper end of the auxiliary arm 804c and brake arm 804a.

Figure 8B:
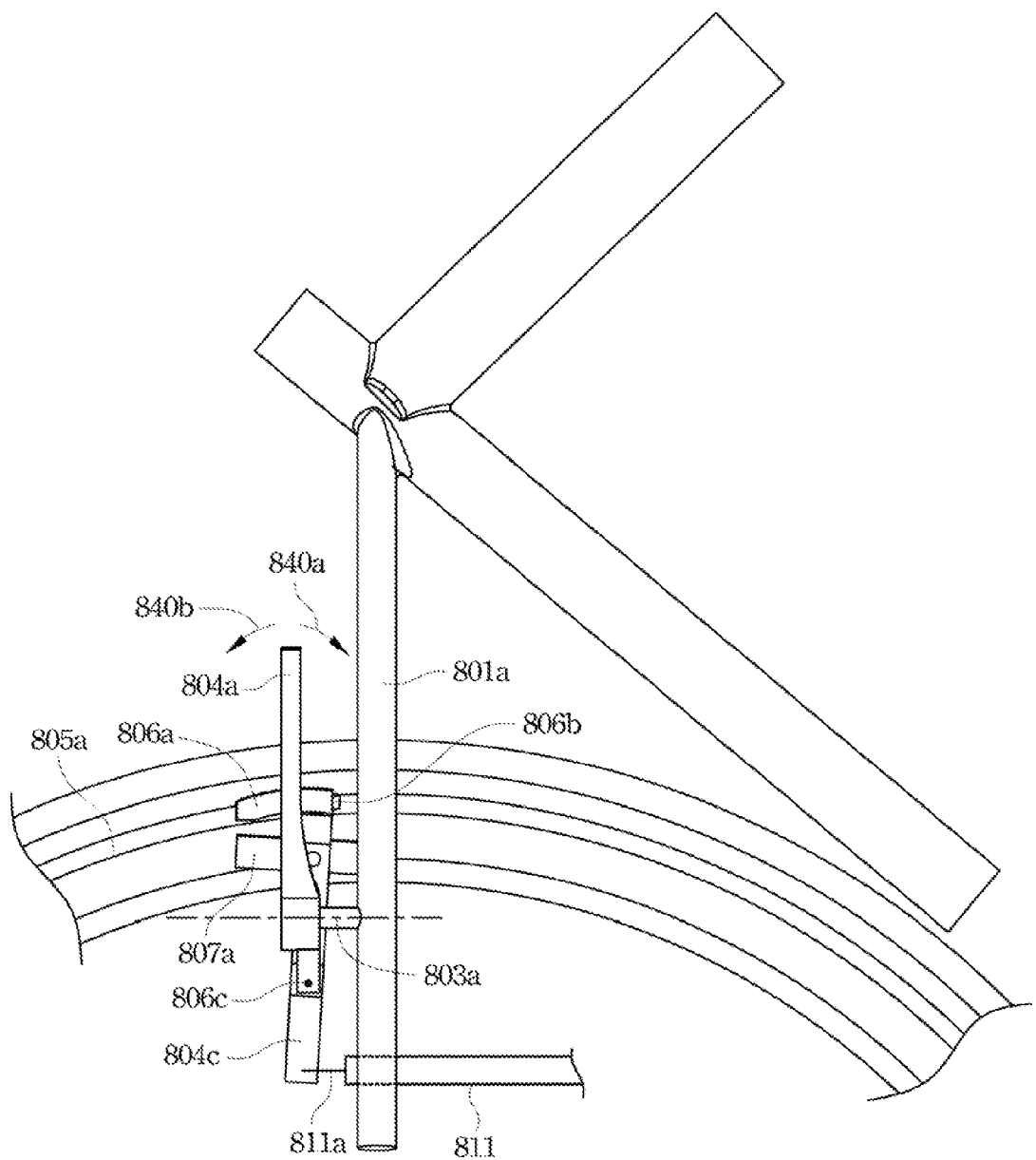
FIG. 8B illustrates a side view of the rear cantilever brake and the transmission device as illustrated in FIG. 8.

FIG. 8B illustrates a side view of the rear cantilever brake and the transmission device as illustrated in FIG. 8 (the brake arm 804b is omitted). When the brake pad 807a is in contact with a rim 805b of the rear wheel 805, the auxiliary arm 804c is swiveled along a direction 840a about the pivot axis 806c to enable its lower end to pull a wire core 811a of the brake cable 811, which connects to a front brake. When the brake pad 807a is away from the rim 805a of the rear wheel 805, the wire core 811a pulls the lower end of the auxiliary arm 804c back to an original position such that the auxiliary arm 804c is swiveled along a direction 840b about the pivot axis 806c. A resilient member, e.g. a torsion spring, may be installed around the pivot axis 806c to recover the auxiliary arm 804c back to an original position when the brake pad 807a is away from the rim 805a.

Figure 8C:
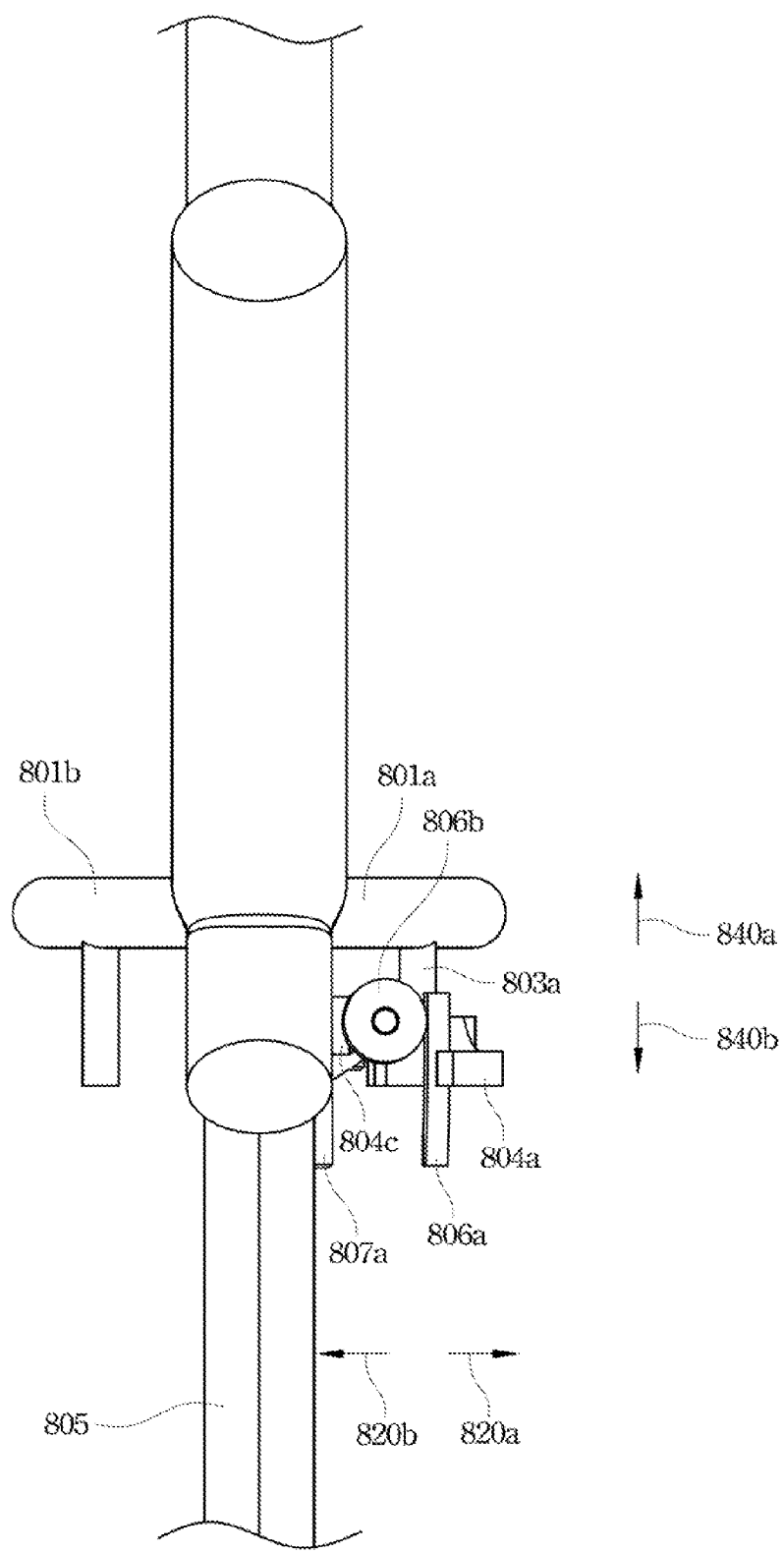
FIG. 8C illustrates a top view of the rear cantilever brake and the transmission device as illustrated in FIG. 8.

FIG. 8C illustrates a top view of the rear cantilever brake and the transmission device as illustrated in FIG. 8 (the brake arm 804b is omitted). The above-mentioned operation mechanism is further described from a top view. When the upper end of the brake arm 804a is swiveled along the direction 820b to move the brake pad 807a in contact with the rear wheel 805, the auxiliary arm 804c is swiveled along the direction 840a. When the upper end of the brake arm 804a is swiveled along the direction 820a to move the brake pad 807a away from the rear wheel 805, the auxiliary arm 804c is swiveled along the direction 840b.

Figure 8D:
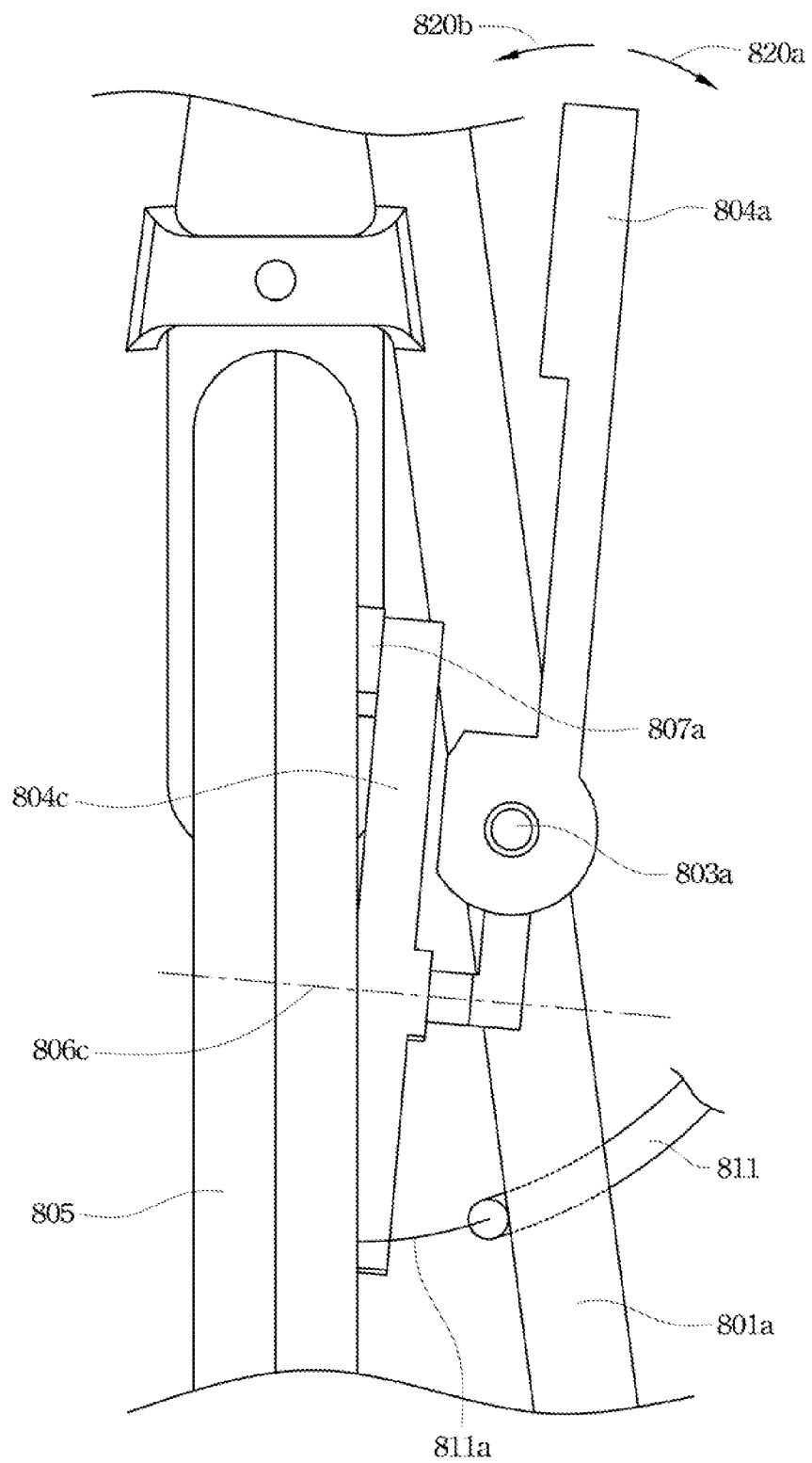
FIG. 8D illustrates a rear cantilever brake and a transmission device according to still another embodiment of this invention.

FIG. 8D illustrates a rear cantilever brake and a transmission device according to still another embodiment of this invention. In this embodiment (referring also to FIG. 8A), the roller 806b is removed from an upper end of the auxiliary arm 804c whereas the support member 806a is removed from the brake arm 804a. That is, the upper end of the auxiliary arm 804c is not slidably connected with the brake arm 804a any more. The pivot connection between the auxiliary arm 804c and the brake arm 804a becomes the only connection therebetween.

Figure 9:
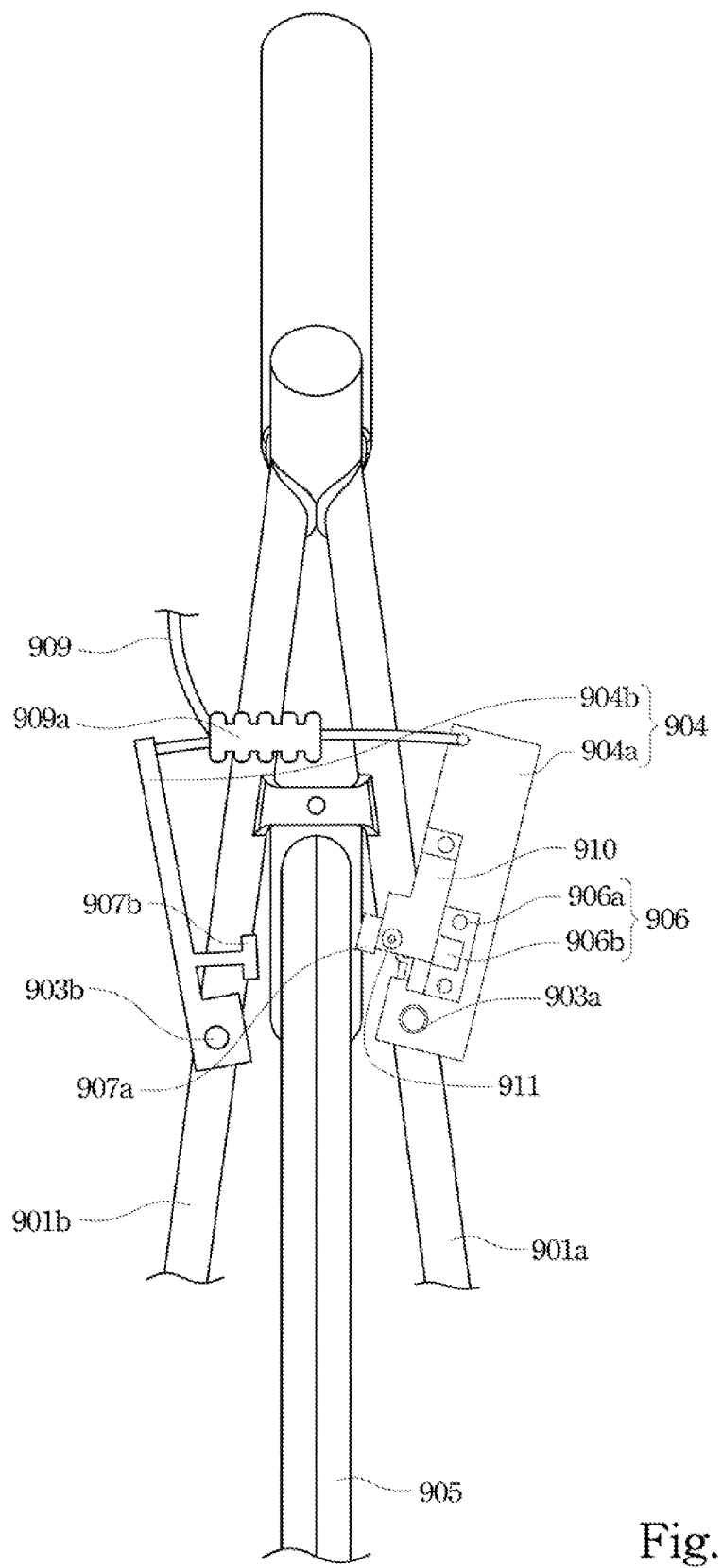
FIG. 9 illustrates a rear cantilever brake and a transmission device according to still another embodiment of this invention where the rear cantilever brake is not actuated.
Figure 11:
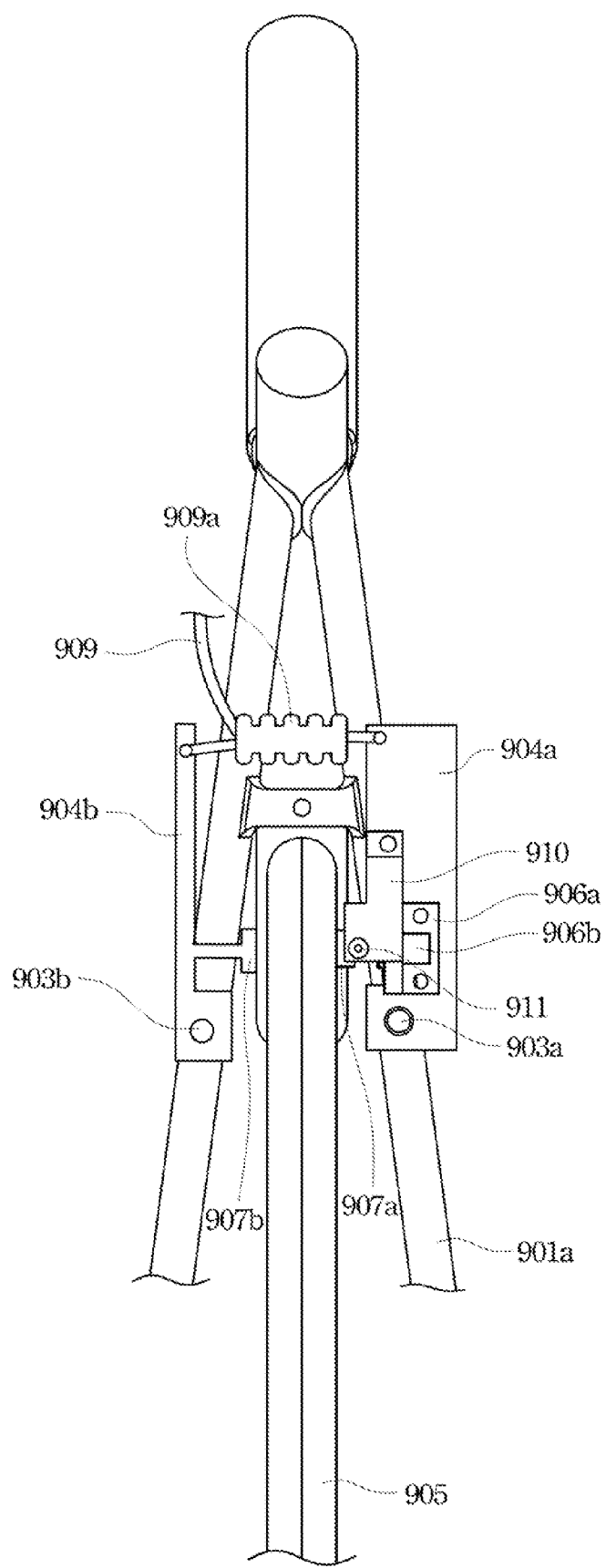
FIG. 11 illustrates the rear cantilever brake and the transmission device as illustrated in FIG. 9 where the rear cantilever brake is actuated.

FIG. 9 and FIG. 11 respectively illustrate a rear cantilever brake and a transmission device according to still another embodiment of this invention, wherein the rear cantilever brake in FIG. 9 is not actuated to brake a wheel and the rear cantilever brake in FIG. 11 is actuated to brake a wheel. In this embodiment, a transmission device is also integrated into the "cantilever brake". A rear cantilever brake 904 basically includes two brake arms (904a, 904b). The transmission device 906 can be integrated into either one or both of the two brake arms (904a, 904b). The brake arm 904a is pivotally connected with a seat stay 901a (part of a bicycle frame) with its lower end so as to be swiveled about a pivot axis 903a. The brake arm 904b is pivotally connected with a seat stay 901b (part of a bicycle frame) with its lower end so as to be swiveled about a pivot axis 903b. A brake cable 909 (e.g. a Bowden cable) is associated with both two upper ends of the two brake arms (904a, 904b) to actuate their respective brake pads (907a, 907b) to brake a rear wheel 905. A resilient member 909a, e.g. containing a compression spring inside, is to return two upper ends of the two brake arms (904a, 904b) to an original position (as illustrated in FIG. 9) where the brake cable 909 is not actuated by a brake lever, e.g. the brake lever 202 as illustrated in FIG. 2.

When the rear cantilever brake 904 is not actuated (as illustrated in FIG. 9), the two brake arms (904a, 904b) are away enough from each other such that their respective brake pads (907a, 907b) do not brake (are not in contact with) the rear wheel 905. Accordingly, the transmission device 906, which consists of a slider guide 906a and a slider 906b, would not be actuated.

When the rear cantilever brake 904 is actuated (as illustrated in FIG. 11), the two brake arms (904a, 904b) are closer to each other (compared with FIG. 9) such that their respective brake pads (907a, 907b) brake (are in contact with) the rear wheel 905. Accordingly, the transmission device 906, which consists of a slider guide 906a and a slider 906b, would be actuated. When the rear cantilever brake 904 is not actuated again, the two brake arms (904a, 904b) return to their respective positions as illustrated in FIG. 9 by a recovery force of the resilient member 909a or a torsion spring (not illustrated in the drawings) arranged around the pivot axis (903a, 903b).

Although the cantilever brake illustrated in FIG. 9 and FIG. 11 embodies a side-pull cantilever brake (also referred as a V-brake), the transmission device is also integrated into other types of cantilever brakes, e.g. a centre-pull cantilever brake.

Figure 10:
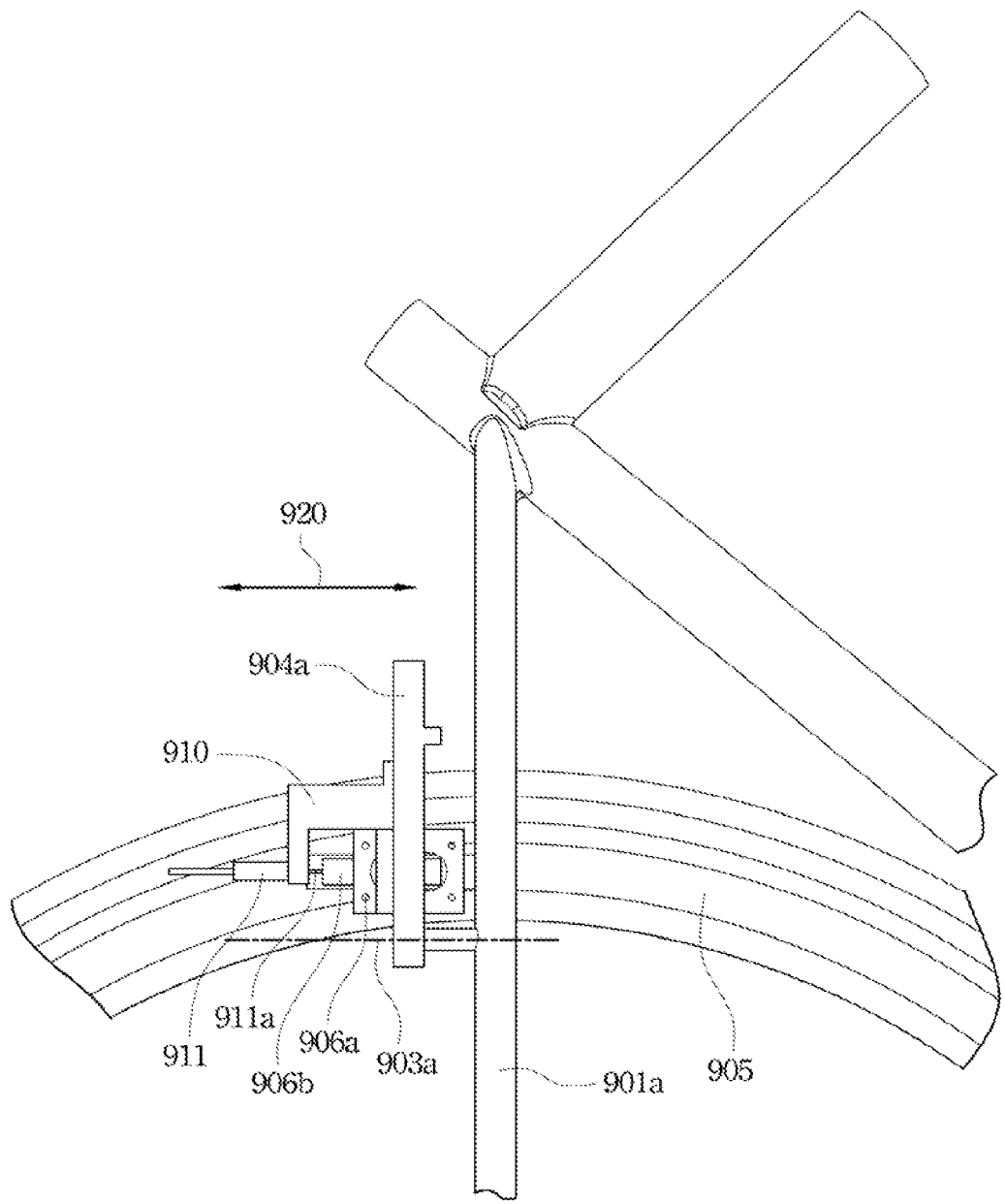
FIG. 10 illustrates a side view of the rear cantilever brake and the transmission device as illustrated in FIG. 9.
Figure 12:
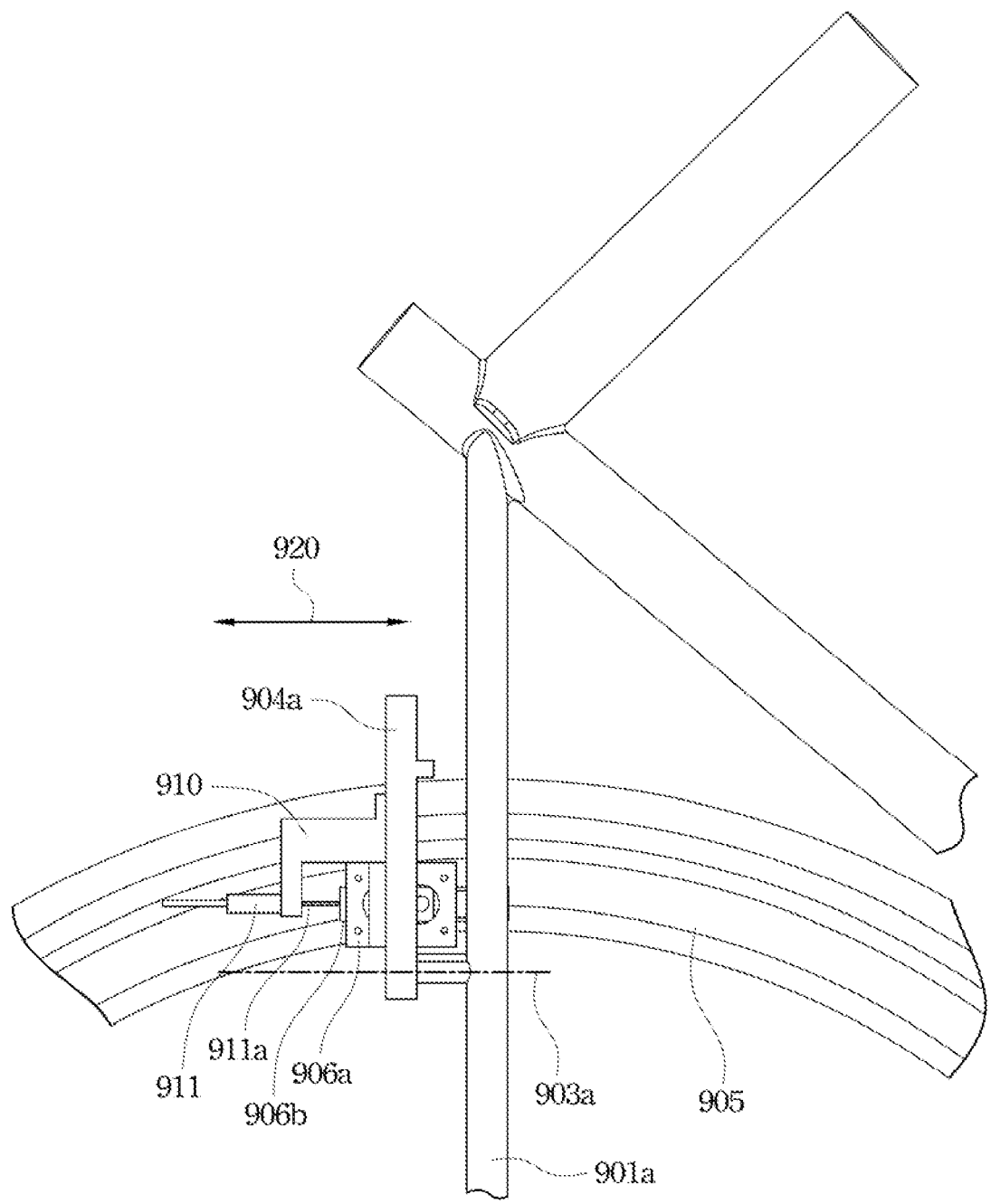
FIG. 12 illustrates a side view of the rear cantilever brake and the transmission device as illustrated in FIG. 11.

FIG. 10 illustrates a side view of the rear cantilever brake and the transmission device as illustrated in FIG. 9, and FIG. 12 illustrates a side view of the rear cantilever brake and the transmission device as illustrated in FIG. 11. An operation mechanism of the rear cantilever brake's right half is further described below with reference to FIGS. 10 and 12.

An L-shaped bracket 910 has an end secured to the brake arm 904a and an opposite end for holding the brake cable 911 (e.g. a Bowden cable). A wire core 911a of the brake cable 911 is attached to the brake pad 907a or the slider 906b, which is slidably connected with the slider guide 906a along a direction 920. The direction 920 is generally in parallel with the pivot axis 903a.

When the transmission device 906 is not actuated (as illustrated in FIG. 10), the wire core 911a is not pulled by the slider 906b (or the brake pad 907a) to actuate a front to brake, e.g. a front brake 106 as illustrated in FIG. 1.

When the transmission device 906 is actuated (as illustrated in FIG. 12), the wire core 911a is pulled by the slider 906b (or the brake pad 907a) to actuate a front brake, e.g. a front brake 106 as illustrated in FIG. 1. When the transmission device 906 is not actuated again, the slider 906b is pulled by the wire core 911a and returns to an original position as illustrated in FIG. 10.

In addition, the brake arm 904a can be made longer or shorter to adjust the applied brake force on the rear wheel 905 (applied by the brake pad 907a), thereby further adjusting a pulling force applied to the wire core 911a of the brake cable 911 (applied by the brake pad 907a or the slider 906b).

Figure 13:
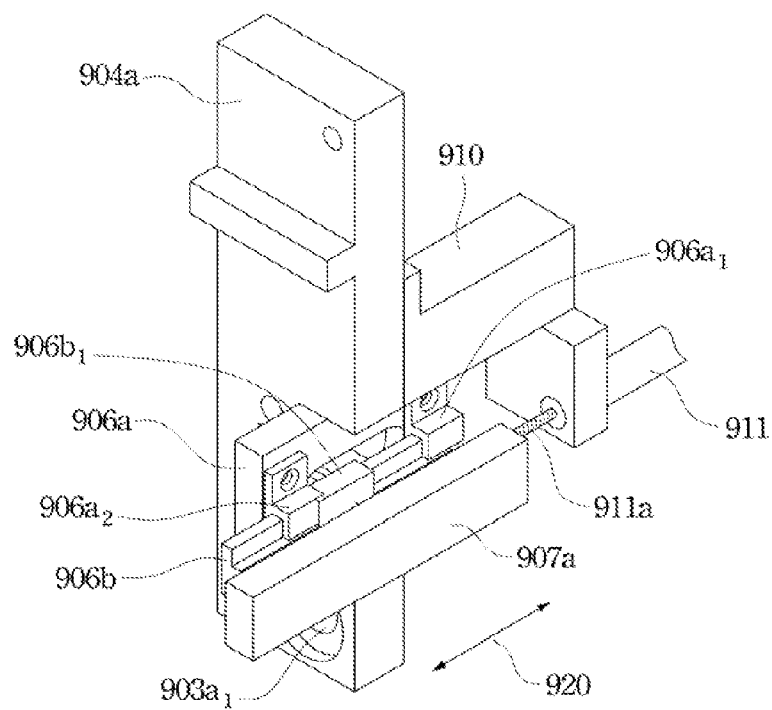
FIG. 13 illustrates a perspective view of a right half of the rear cantilever brake as illustrated in FIG. 9.
Figure 14:
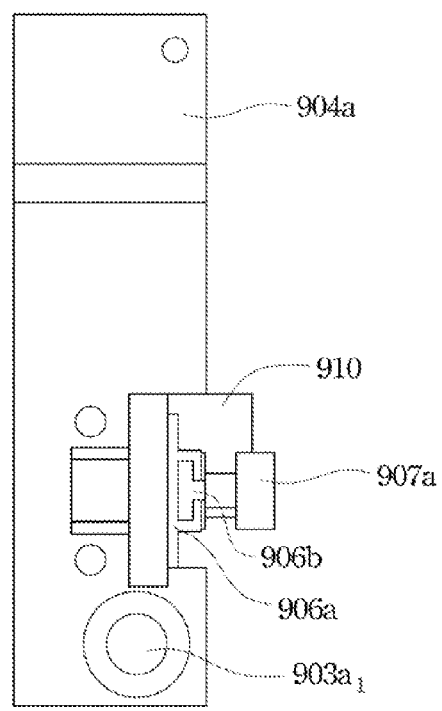
FIG. 14 illustrates a front view of the right half of the rear cantilever brake as illustrated in FIG. 13.

FIG. 13 illustrates a perspective view of a right half of the rear cantilever brake as illustrated in FIG. 9, and FIG. 14 illustrates a front view of the right half of the rear cantilever brake as illustrated in FIG. 13. As shown in FIG. 14, the brake pad 907a is secured to the slider 906b, the slider guide 906a is secured to the brake arm 904a, and the slider 906b is slidably connected with the slider guide 906a. Therefore, the brake pad 907a is slidably connected with the brake arm 904a. Besides, a pivot hole $903a_1$ is for pivotally connecting with the pivot axis 903b of the seat stay 901a (as illustrated in FIG. 10).

As shown in FIG. 13, the slider guide 906a has two stop members ($906a_1$ and $906a_2$) to restrict an extension member $906b_1$ of the slider 906b such that the slider 906b slides back and forth along the direction 920 within a limited region. With this limited region, the slider 906b would not overly pull the wire core 911a of the bake cable 911.

The slider guide 906a and slider 906b can be made from metallic materials, which could provide low friction sliding surface. In this embodiment, the slider 906b is made from brass or other alloy of cooper, and the slider guide 906a is made from bronze or other alloy of cooper. The slider guide 906a may be oil-impregnated such that the slider 906b can be slid along the slider guide 906a with an even low friction. Besides, the brake arm 904a can be made from lightweight alloys, such as alloys of aluminum, titanium or magnesium, so as to make the brake arm itself light and robust.

It should be noted that the slider guide 906a and slider 906b are herein to provide a slidable movement between the brake pad 907a and the brake arm 904a. This mechanism, i.e. the slider guide and slider, may be replaced by other mechanism, which could provide a low-friction and slidable connection between the brake pad 907a and the brake arm 904a.

According above-discussed embodiments, the brake system disclosed herein tunes the front braking force so quickly that the rear wheel never has a chance to lift off the ground. Once the rear wheel starts to skid, the system immediately releases the correct amount of tension in the front brake cable, thereby keeping the rear wheel on the ground, reducing the skid, and still stopping in the shortest possible distance. Because of this feature, a rider's ability to stop in a short distance is not determined by his/her strength or skill, and rider error has been effectively removed.

In addition, the failsafe design of the brake system insures that the rear brake will remain functional should something within the brake system or the front brake malfunction. Also, the brake system compensates for slippery/wet conditions and helps to eliminate the front tire skidding and coming out from under a rider during turns on wet/slick surfaces.

Therefore, the brake system disclosed herein is a dynamic, tunable, real time braking system that compensates for every situation instantaneously and under any road conditions. It is also a brake system that is capable of protecting the rider from his/herself in the event of a panic stop where too much braking force is applied. The brake system reduces just enough front brake force to keep the rear wheel on the ground, yet keeps just enough brake force to allow the rider to slow in the least possible distance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus in direct physical contact with a rear brake mounted on a bicycle having a front wheel on a front portion of the bicycle and a rear wheel on a rear portion of the bicycle, the bicycle having a front brake for slowing the front wheel and the rear brake for slowing the rear wheel, the apparatus comprising
   a slider in direct physical contact with a brake pad of the rear brake;
   a slider guide slidably connected to the slider, the slider guide in direct physical contact with a rear brake arm of the rear brake; and
   a wire core in direct physical contact with both the slider and the front brake.

2. The apparatus of claim 1, wherein the wire core of the front brake cable actuates the front brake of the bicycle.

3. The apparatus of claim 1 wherein the slider slides against a portion in the slider guide.

4. The apparatus of claim 1 wherein the brake pad is aligned with a rim portion of the rear wheel of the bicycle.

5. The apparatus of claim 4 wherein friction between the rim portion of the rear wheel and the brake pad causes the slider to slide against the slider guide.

6. The apparatus of claim 5 wherein the movement of the slider causes the wire core of the front brake cable to move.

7. The apparatus of claim 6 wherein the front brake of a bicycle is actuated by a movement of the wire core.

8. The apparatus of claim 1 wherein the front brake is a disk brake coupled to the front wheel of the bicycle.

9. An apparatus in direct physical contact with a rear brake mounted on a bicycle having a front wheel on a front portion of the bicycle and a rear wheel on a rear portion of the bicycle, the bicycle having a front brake for slowing the front wheel and the rear brake for slowing the rear wheel, the apparatus comprising:
   a slider in direct physical contact with a brake pad of the rear brake;
   a slider guide in direct physical contact with a rear brake arm of the rear brake, the slider guide slidably coupled to the slider; and
   a front brake actuator in direct physical contact with both the slider and the front brake.

10. The apparatus of claim 9, wherein the front brake actuator actuates the front brake of the bicycle.

11. The apparatus of claim 9 wherein the slider slides against a portion in the slider guide.

12. The apparatus of claim 9 wherein the brake pad is aligned with a rim portion of the rear wheel of the bicycle.

13. The apparatus of claim 12 wherein friction between the rim portion of the rear wheel and the brake pad causes the slider to slide against the slider guide.

14. The apparatus of claim 13 wherein the front brake actuator includes a wire core and the movement of the slider causes the wire core to move.

15. The apparatus of claim 14 wherein the front brake of a bicycle is actuated by a movement of the wire core.

16. The apparatus of claim 9 wherein the front brake is a disk brake coupled to the front wheel of the bicycle.

17. A method comprising:
   providing a bicycle having a front wheel on a front portion of the bicycle and a rear wheel on a rear portion of the bicycle, the bicycle having a front brake for slowing the front wheel and a rear brake for slowing the rear wheel;

providing a slider in direct physical contact with a brake pad, a slider guide coupled to the slider and a wire core coupled to the slider, the slider is in direct physical contact with the rear brake; and compressing the brake pad against a rim portion of the rear wheel of the bicycle that is rotating;

wherein friction between the brake pad against the rear wheel causes the slider to slide against the slider guide in a first direction; and wherein the sliding movement of the slider in the first direction pulls the wire core to actuate a front brake of the bicycle.

18. The method of claim 17 further comprising:

skidding the rear wheel against the ground;

sliding the slider against the slider guide in a second direction; and releasing tension in the wire core sliding the slider against the slider guide in a second direction to de-actuate the front brake.

19. The method of claim 17 further comprising:

preventing the front wheel coupled to the bicycle from skidding against the ground while the bicycle is moving by releasing tension in the wire core sliding the slider against the slider guide in a second direction to de-actuate the front brake.

20. The method of claim 17 further comprising:

actuating a brake lever coupled to the bicycle;

moving a rear brake cable; and actuating a rear brake to compress the rear brake pad against the rim portion of the rear wheel.

* * * * *